United States Patent
Kresse et al.

(10) Patent No.: US 8,935,068 B2
(45) Date of Patent: Jan. 13, 2015

(54) SYSTEM AND METHOD FOR OPTIMIZING DOWNSHIFTING OF A TRANSMISSION DURING VEHICLE DECELERATION

(71) Applicant: Allison Transmission Inc., Indianapolis, IN (US)

(72) Inventors: John Kresse, Martinsville, IN (US); John A. Byerly, Carmel, IN (US); Todd Dygert, Brownsburg, IN (US); Mark A. Rains, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/920,168

(22) Filed: Jun. 18, 2013

(65) Prior Publication Data

US 2014/0336890 A1 Nov. 13, 2014

Related U.S. Application Data

(60) Provisional application No. 61/820,441, filed on May 7, 2013.

(51) Int. Cl.
*G06F 7/00* (2006.01)
*F16H 61/68* (2006.01)

(52) U.S. Cl.
CPC ................................ *F16H 61/68* (2013.01)
USPC .............................................. 701/65; 701/51

(58) Field of Classification Search
CPC ..... B60W 10/06; B60W 10/08; B60W 10/10; B60W 10/18; B60W 20/102; B60W 20/104; F16H 61/21; F16H 2059/186
See application file for complete search history.

(56) References Cited

U.S. PATENT DOCUMENTS

| | | | |
|---|---|---|---|
| 6,278,928 B1 * | 8/2001 | Aruga et al. | 701/65 |
| 6,370,470 B1 * | 4/2002 | Yamamura et al. | 701/96 |
| 6,679,807 B2 * | 1/2004 | Kato et al. | 477/107 |
| 6,732,039 B2 * | 5/2004 | Ino et al. | 701/93 |
| 6,746,368 B2 * | 6/2004 | Adachi et al. | 477/169 |
| 6,847,880 B2 * | 1/2005 | Ishizu et al. | 701/95 |

(Continued)

OTHER PUBLICATIONS

From the International Searching Authority; Notification of Transmittal of the International Search Report and the Written Opinion of the International Seraching Authority, or the Declaration; Feb. 7, 2014; pp. 1-9; Korean Intellectual Property Office.

*Primary Examiner* — David D Le
(74) *Attorney, Agent, or Firm* — Taft Stettinius + Hollister, LLP; Stephen F. Rost

(57) ABSTRACT

A method of selecting a gear ratio of a transmission. The method includes measuring a current road grade with a sensing device and communicating the current road grade measurement to the controller. The controller receives a signal corresponding to a service brake input and determines a desired maximum acceleration limit of the vehicle. The method also includes calculating a predicted vehicle acceleration, measuring a current vehicle acceleration, and calculating an error value as a function of the predicted vehicle acceleration and measured vehicle acceleration. The method also computes an estimated required tractive braking effort and estimated tractive braking effort for at least one of N automatically selectable gear ratios of the transmission and selects one gear ratio of the N automatically selectable gear ratios for the operation of the transmission based on a comparison of the estimated required tractive braking effort and estimated tractive braking effort.

20 Claims, 5 Drawing Sheets

(56) References Cited

U.S. PATENT DOCUMENTS

| | | | |
|---|---|---|---|
| 7,092,811 B2* | 8/2006 | Ishizu et al. | 701/93 |
| 7,966,115 B2* | 6/2011 | Bellinger | 701/55 |
| 2004/0259684 A1 | 12/2004 | Kresse et al. | |
| 2007/0173372 A1 | 7/2007 | Ueno | |
| 2008/0167161 A1 | 7/2008 | Mitchell et al. | |
| 2008/0293541 A1 | 11/2008 | Kanafani et al. | |
| 2010/0248896 A1 | 9/2010 | Dreier | |

* cited by examiner

SYSTEM AND METHOD FOR OPTIMIZING DOWNSHIFTING OF A TRANSMISSION DURING VEHICLE DECELERATION

RELATED APPLICATIONS

This application claims priority to U.S. Provisional Patent Application Ser. No. 61/820,441, filed May 7, 2013, which is hereby incorporated by reference in its entirety.

FIELD OF THE DISCLOSURE

The present disclosure relates to a transmission control system, and in particular, to a system and method for controlling preselect shifts in a transmission to optimize vehicle deceleration.

BACKGROUND

In a conventional powered vehicle, vehicle deceleration can be controlled via a plurality of means. For instance, the vehicle can include a brake pedal upon which the vehicle operator can engage vehicle or service brakes from inside the vehicle. Depending upon the force applied to the brake pedal and the length of time the pedal is pressed, the vehicle will decelerate accordingly. A similar mechanism, such as a lever or switch, may be positioned within the vehicle such the operator can actuate such mechanism to reduce vehicle speed.

Some vehicles may include an engine brake or retarder within an engine of the vehicle to control retarding forces thereof and reduce vehicle speed. Engine braking can often be controlled by an engine controller that is programmed to control the performance and operation of the engine. Other types of braking mechanisms such as exhaust brakes, compression-release brakes, and the like can be used to control vehicle speed.

SUMMARY

In an embodiment of the present disclosure, a method is provided for selecting a gear ratio of a transmission in a motor vehicle to produce an increase in negative input torque. The transmission includes a controller and N automatically selectable gear ratios. The method includes measuring a current road grade with a sensing device and communicating the current road grade measurement to the controller; receiving a signal corresponding to a service brake input from the vehicle; determining a desired maximum acceleration limit of the vehicle based on the current road grade and service brake input signal; calculating a predicted vehicle acceleration based on the current road grade and an estimated vehicle mass; measuring a current vehicle acceleration; calculating an error value as a function of the predicted vehicle acceleration and measured vehicle acceleration; computing an estimated required tractive braking effort and estimated tractive braking effort for at least one of the N automatically selectable gear ratios of the transmission; and selecting one gear ratio of the N automatically selectable gear ratios for the operation of the transmission based on a comparison of the estimated required tractive braking effort and estimated tractive braking effort.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
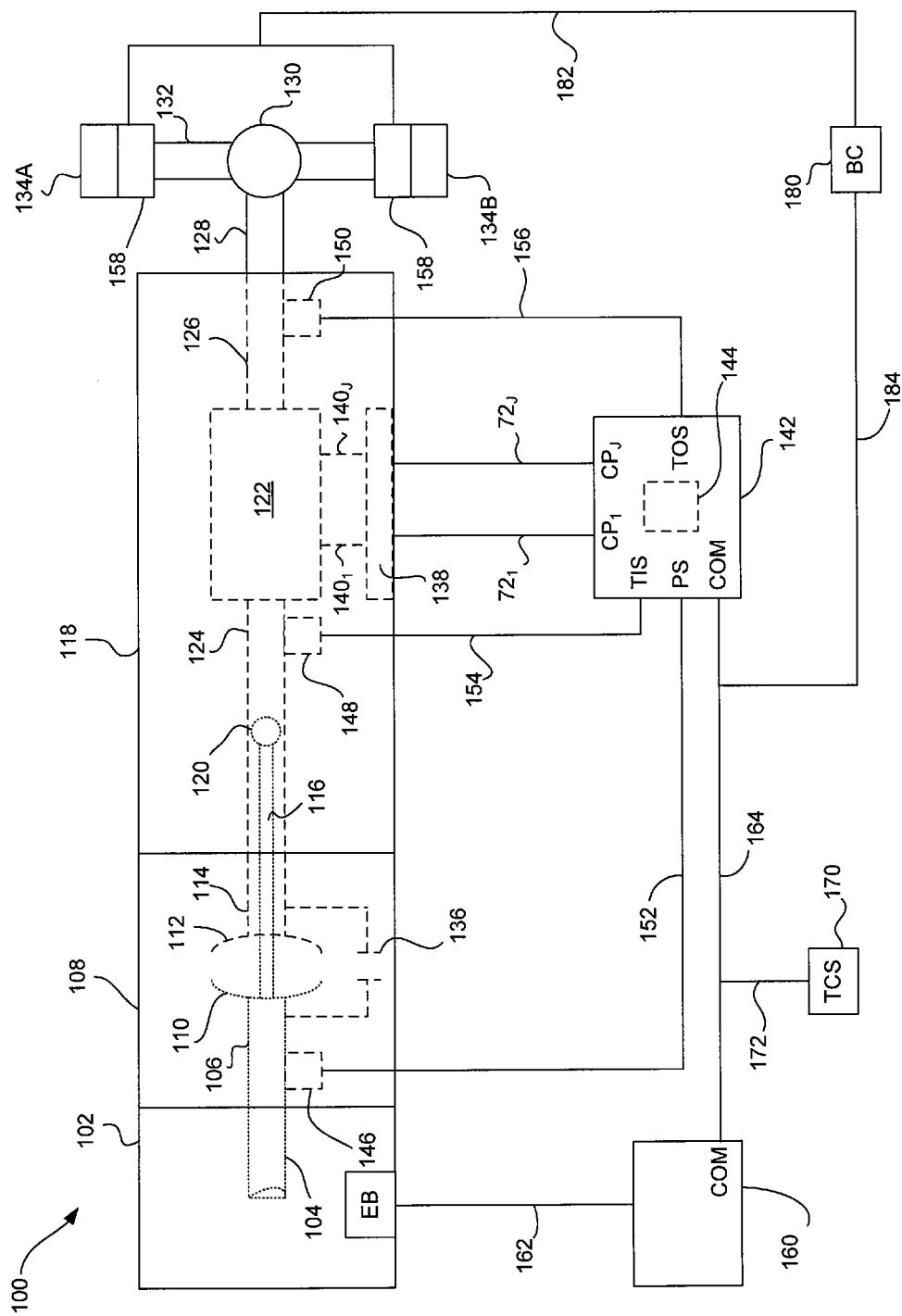
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears (i.e., each having its own discrete gear ratio). Alternatively, the transmission 118 may be structured as an infinitely-variable transmission (IVT) or continuously-variable transmission (CVT) which can produce an infinite number of gear ratios or speed ratios. In any event, an output shaft 126 of the transmission 118 is coupled to or integral with, and rotatably drives, a propeller or drive shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller or drive shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 can further include a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gear ratios or speed ratios of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit 102 may include an engine brake (EB), exhaust brake, or similar speed-retarding device for reducing the speed of the drive unit 102. The drive unit control circuit 160 can be electrically and operably coupled to the speed-retarding device (EB) via one of the signal paths 162 to control the speed of the drive unit 102.

The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

In FIG. 1, the vehicular system 100 can also include a throttle control sensor (TCS) 170 that is disposed in electrical communication with an accelerator pedal (not shown) or other mechanism that can be actuated by an operator of the vehicular system 100 to increase the speed thereof. As the accelerator pedal or other mechanism is actuated or triggered, the position of the accelerator pedal or throttle percentage can be communicated to or measured by the throttle control sensor 170. In turn, the throttle control sensor 170 can send a corresponding signal along signal path 172 which can be received by the drive unit control circuit 160 or transmission control circuit 142. The signal path 172 can be coupled to the data link 164 as previously described.

In addition, a service brake 158 can be operably coupled to the axle 132 to control the speed of wheels 134A, 134B. A pedal, lever, or other mechanism can be accessible to the operator to control the operation of the service brake 158. Thus, as the operator desires to decrease the speed of the vehicular system, the operator may actuate or engage the service brake 158. In doing so, the service brake 158 may be operably controlled by a brake controller (BC) 180. In any event, the use or control of the service brake 158 can be communicated to the drive unit control circuit 160 or transmission control circuit 142 via signal path 184, which can be electrically coupled to the data link 164 as described above. Other arrangements may be possible for communicating the use and control of the accelerator pedal and service brake 158 to the drive unit control circuit 160 or transmission control circuit 142, the manner previously described is only intended to serve as one example. Moreover, the operator may be able to actuate or engage the engine brake (EB) or speed-retarding device of the drive unit 102 to further control its output. The manner in which the operator controls the engine brake or speed-retarding device can be communicated to the transmission control circuit 142 in the form of an electrical signal as described herein.

In many applications, a transmission control circuit is designed to determine what range a transmission should be operating in based on various parameters. In one aspect, the transmission control circuit can determine transmission range based on accelerator pedal position and engine torque. The transmission control circuit may also determine range based on a cruise control setting of the vehicle. To actuate or enable a cruise control setting, a switch or control may be accessible to a vehicle operator, and upon actuation, a corresponding signal indicating such actuation can be communicated to the transmission control circuit. Alternatively, or in addition, the transmission control circuit may determine transmission range when an engine brake, such as a compression brake, exhaust brake, or variable geometry turbocharger, is producing negative torque. Most applications are specific to a type of vehicle, such as a pickup truck or passenger car.

One of the problems the transmission control circuit has when selecting or preselecting a certain range, particularly when descending a hill or coasting at negative engine torque, is downshifting too aggressively or not enough. Often times a conventional control circuit will preselect a certain range that is undesirable to the operator of the vehicle. Moreover, conventional transmission control circuits cannot conform or control transmission shifting with different combinations of axle size, tire size, engine type, or vehicle type. As such, most shifting is designed specifically for a type of engine or vehicle application, and as a result an operator's intention or desire during vehicle operation is not considered. A operator's intention may depend on whether the engine brake is applied or unapplied, a cruise control setting is enabled, whether a service brake is applied, etc.

In the present disclosure, different embodiments and aspects of a transmission control system and process is provided for any type of vehicle or machine and considerations are built into the system and process for controlling the transmission as a function of an operator's intention. The embodiments and aspects of this disclosure provide a means for determining or preselecting a transmission range or gear ratio when an accelerator pedal is not engaged (i.e., 0% throttle) under most negative torque circumstances. As a result, these embodiments can improve drivability, reduce wear on brakes, and improve fuel economy. The embodiments and aspects of this disclosure can be applied to a transmission having a plurality of selectable ranges, i.e., each with a discrete gear ratio, or an infinite number of gear or speed ratios (e.g., an infinitely-variable transmission). In the case of an infinite number of gear or speed ratios, the system and method described herein can preselect a specific gear or speed ratio based on an operator's intention.

Figure 2:
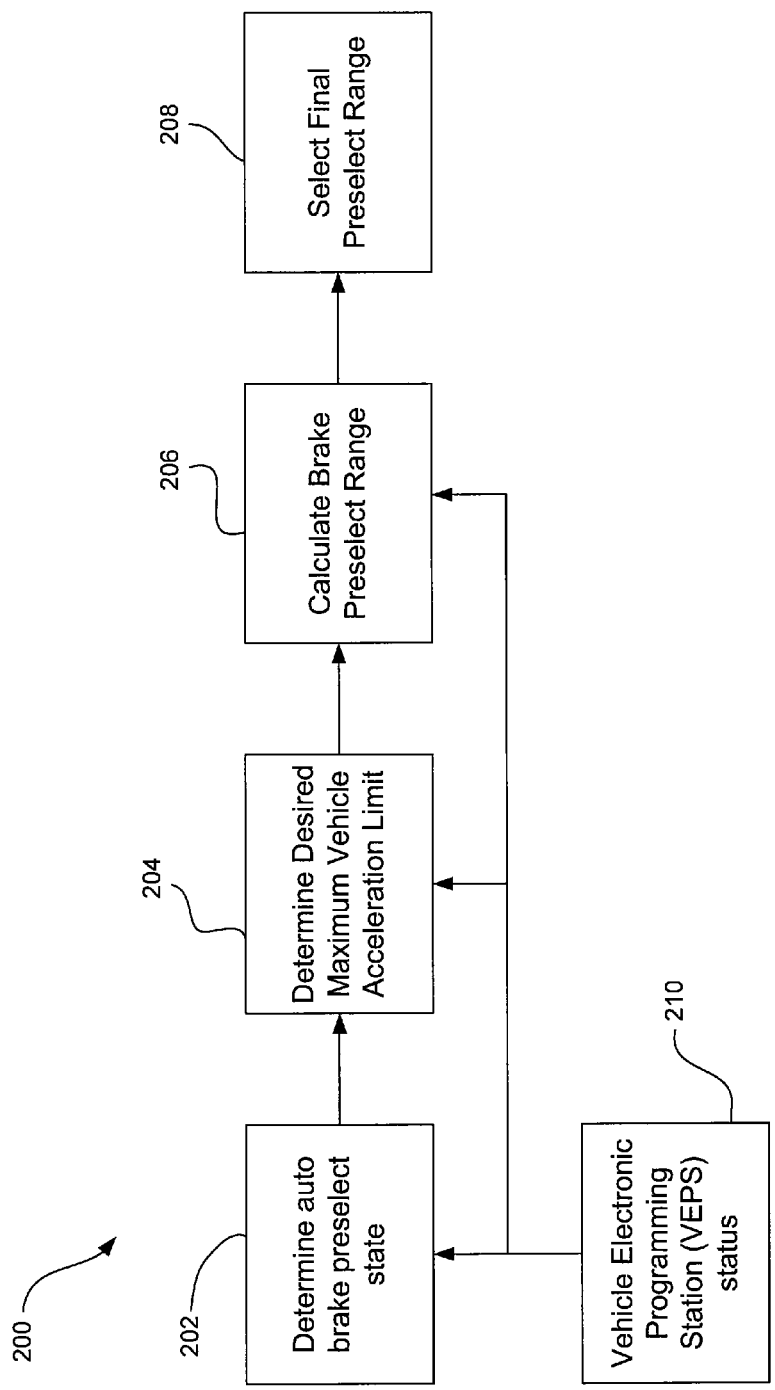
FIG. 2 is a flow diagram of a system and process for optimally downshifting a transmission during negative engine torque operation.

Referring to FIG. 2, one embodiment of a method 200 of preselecting a transmission range or gear ratio is provided. The method 200 can include a plurality of blocks or steps, each of which includes one or more instructions that can be stored in the memory 144 and operably performed by the transmission control circuit 142. In one block 202 of the method 200, the transmission control circuit can determine whether to enable a set of instructions for performing the method 200. In other words, the method 200 may only be performed in some instances if a certain set of conditions or criteria are met. As will be described, if the vehicle speed is increasing rather than decreasing, then the method 200 will not performed. Thus, in block 202, the transmission control circuit 142 can perform a set of preliminary checks or determinations before enabling the method 200.

Figure 3:
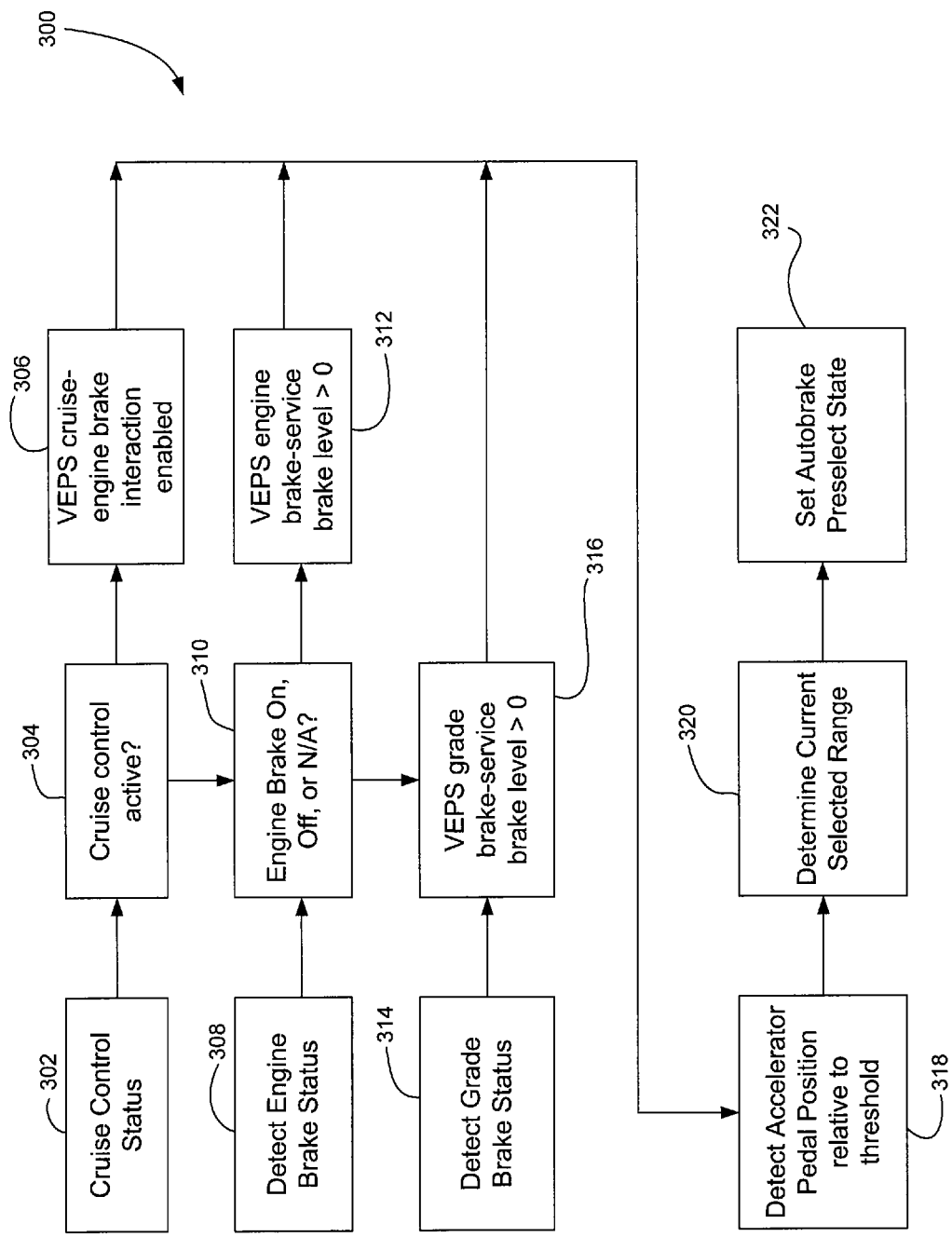
FIG. 3 is a flow diagram of a system and process for determining whether to enable an autobrake preselect state.

In FIG. 3, an example of different conditions or considerations made in block 202 are illustrated. It is to be understood that this is only an example, and that other embodiments may provide other conditions or considerations. In any event, the transmission control circuit 142, abbreviated herein as TCC, can perform a process 300 of evaluating the different conditions or considerations shown in FIG. 3. For instance, the transmission control circuit 142 can determine whether to enable method 200 by considering a cruise control status in block 302, an engine brake status in block 308, or an grade brake status in block 314. The manner in which the TCC considers each condition or status may depend on the type of vehicle or instructions stored in the memory of the TCC.

Nonetheless, in block 302, the TCC detects the status of cruise control in block 302. The cruise control setting can be triggered by the operator between an active state and an inactive state. If cruise control is activated, the TCC can determine in block 304 of such a condition by receiving a corresponding signal from the switch or mechanism triggered by the operator. Although this is not shown in FIG. 1, an independent signal path may be electrically coupled either directly to the TCC or indirectly to the TCC via data link 164. In the same manner, the TCC can determine if the cruise control setting is inactive as well.

In the event the cruise control setting is inactive in block 304, the TCC can further determine the status of an engine brake in block 308. Here, the engine brake can refer to the speed-retarding device (EB) shown in FIG. 1. The engine brake can be a compression brake, exhaust brake, variable geometry turbocharger, or any other mechanism capable of producing negative torque. In one aspect, the TCC is not controlling the engine brake. This may be controlled by the drive unit control circuit 160 or the operator (e.g., via a lever, switch, or other control mechanism that can be used to control the level of desired negative torque produced by the engine brake). In the event a lever or other control device is operably controlled by the operator, the level of braking by the operator during vehicle operation can be used to further detect the operator's intent. For instance, the use of the lever or control mechanism can send an electrical signal to the TCC to communicate such desired torque control.

In a further aspect, a multi-level engine brake system can be incorporated into the vehicular system 100. Here, a proportional control can be used for controlling two or more sets of cylinders on a compression brake, move a variable-geometry turbocharger, or exhaust brake. There can be switches or the like corresponding to different torque levels such that depending on a position of one or more switches, the TCC can infer operator's intent accordingly. In another aspect, the service brake 158 can be used to infer operator's intent to control vehicle acceleration. Here, a brake pedal or control (i.e., lever, switch, etc.) can be provided upon which the operator controls to command braking. A corresponding signal can be communicated to the TCC based on the type of input provided by the operator to the pedal or control. This can be a variable service brake signal used to detect different levels of braking. For example, the TCC may receive one type of output if the operator only taps the brake pedal or control, whereas the TCC may receive a different type of output if the operator holds the brake pedal or control. In any case, the TCC is structured to receive signals corresponding to different operator commands and, based on the method 200 of FIG. 2, control vehicle acceleration accordingly.

In block 310, the TCC can detect if the engine brake is active, inactive, or unavailable. If the engine brake is unavailable, it may be that the drive unit 102 does not include any type of speed-retarding device. In the event the engine brake is inactive or unavailable, the TCC can further detect the status of grade braking in block 314. The result of each determination in blocks 304, 310, and 314 can be used as conditions for determining what mode or state of control the system is under. The mode or state of control can be used for enabling method 200.

Another consideration is the status or condition of Vehicle Electronic Programming Station (VEPS). VEPS is a means by which one or more sets of instructions or parameters stored in the memory of the TCC can be used to adjust normal operation for individual customers, users, operators, etc. For example, one user may desire a more aggressive set of instructions for controlling vehicle acceleration under method 200, whereas another user may desire a less aggressive set of instructions for method 200. For purposes of this disclosure, VEPS can include a plurality of levels that impact how the TCC controls the shifting of the transmission. Moreover, VEPS can be enabled or disabled. VEPS can be enabled for any of the modes or states of control as described in blocks 306, 312, and 316. In addition, the status of VEPS can be detected by the TCC in block 210. Based on the VEPS status, the feature or features in each of blocks 202, 204, and 206 in method 200 can be established for various vehicular systems.

As described, VEPS can include a plurality of levels that effects the implementation of method 200. The instructions stored in the memory 144 of the TCC 142 can include one or more tables or profile curves from which the TCC can extract information to further implement method 200. These settings can include one or more levels of feature operation (i.e., the lowest level may correspond to a disabled condition). In this case, there may be 1-X levels, where X is a positive integer and 1, X, and each setting therebetween can cause the TCC to operate under method 200 differently. As such, method 200 can be customizable based on vehicle type, engine type, vehicle setup, vehicle operation, industry, application, etc.

As one non-limiting example, in block 312 the TCC can determine whether the VEPS engine brake-service brake level is enabled. If so, the TCC can retrieve information from one or more tables or profile graphs stored in its memory 144. The VEPS may include different settings such as an "off" or "disabled" level, a "low" level, and a "high" level. Based on the level, the TCC can infer how aggressively the operator desires the engine brake to be controlled. In the "off" level, for example, the operator may desire that the TCC never use the engine brake to control vehicle acceleration. In the "low" level, however, the operator may desire an unaggressive use of the engine brake, whereas in the "high" level the operator may desire a greater use of the engine brake to control negative torque passing through the transmission.

Referring to FIG. 3, in block 306 a determination is made whether a VEPS level related to cruise control is enabled. The VEPS engine brake-cruise control interaction level can set forth how aggressively cruise control may command engine brake preselects. In one aspect, there can be a plurality of levels and based on the selected level, the TCC can infer how the operator wants the engine brake to be used for braking. Moreover, in block 312, the TCC can detect how a VEPS engine brake-service brake interaction level is set for determining how aggressively the service brake may command engine brake preselects. In block 316, the TCC can detect how a VEPS grade brake-service brake interaction level is set for how aggressively the service brake commands preselects (i.e., when the engine brake is either disabled or unavailable). Each of the VEPS levels in blocks 312 and 316 can include multiple levels for inferring how the operator wants to control vehicle acceleration.

In block 318, the TCC can further detect accelerator pedal position relative to a threshold condition. In one embodiment, the threshold condition can be a position corresponding to 0% throttle. In another embodiment, there can be a built-in tolerance such that the accelerator pedal position corresponds to approximately 0% throttle ±0.5%. The error can be different for other embodiments. In any event, the TCC is structured to detect negative input torque before enabling method 200. If the accelerator pedal position is greater than the threshold, the TCC does not enable method 200.

In block 320, the TCC also determines the current operating range or gear ratio of the transmission. Here, the TCC can ensure that the vehicle is moving in a forward range (and is not operating in neutral or reverse) before enabling method 200. The direction of the vehicle can be determined based on the range or gear ratio of the transmission. Based on the determinations of blocks 318 and 320, the TCC can enable method 200 in block 322 by setting an "autobrake preselect state" to active. In doing so, the TCC can proceed to block 204 in method 200. In the event one or more conditions is not satisfied in the enabling process 300 of FIG. 3, the TCC does not enable method 200 until each condition set forth in FIG. 3 is satisfied. Moreover, there can be other conditions or determinations for the TCC to consider before enabling method 200.

In block 204, the TCC can determine a desired maximum vehicle acceleration limit. Here, the TCC can derive operator's intended deceleration rate based on road grade, service brake input, engine brake switch input or status, engine brake level, and cruise set speed error. The desired maximum vehicle acceleration limit can be the sum of an adjusted table output and integrated service brake switch status. The table output can be adjusted by a gain and offset which is selected via a table lookup. This may be done using engine brake level and the VEPS level as determined in step 210 for each of the different modes. For example, there can be three sets of tables stored in the memory of the TCC. Each table can use an input of measured road grade and an output of desired maximum vehicle acceleration limit. Moreover, there can be a set of tables for use when the engine brake is active and another set of tables when the engine brake is inactive. Each set can include a plurality of tables and which can be selected by the respective VEPS level. In one aspect, there may be up to five (5) tables. In another aspect, there may be three (3) tables. Other possibilities are within the scope of the present disclosure.

The service brake input can be passed through an integrator and is used to infer the amount of deceleration desired by the operator. This integrator can be reset to zero if the service brake input is inactive. As a result, this allows a "stab braking" maneuver to be successfully accomplished. In other words, a preselect range can be selected while the vehicle operator alternatively allows vehicle speed to increase which is then reduced using some degree of service braking while traveling downhill.

Figure 4:
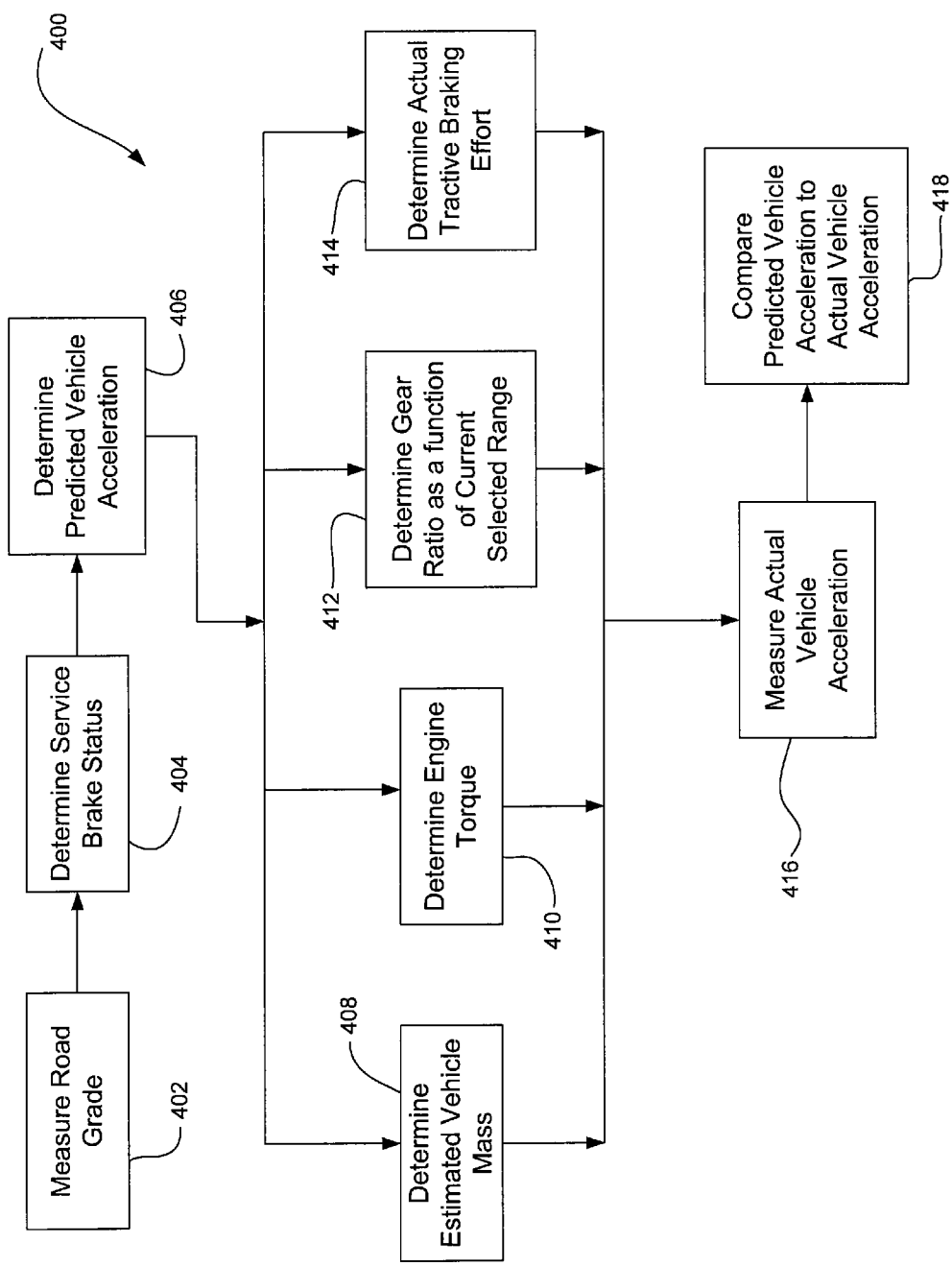
FIG. 4 is a flow diagram of a system and process for determining a predicted vehicle acceleration as a function of road grade, service brake status, and estimated vehicle mass.

Referring to FIG. 4, one embodiment of a method or process 400 for determining desired maximum vehicle acceleration limit in block 204 is shown. The process 400 can include a number of blocks, iterations, or steps to determine a result in block 204, and those shown in FIG. 4 is representative of only a single embodiment. Other blocks, iterations, or steps may be incorporated in other embodiments. As described above, in block 402 the TCC can determine or receive a current road grade (RG) measurement. To obtain road grade (RG), an accelerometer can be coupled to the transmission. For example, an accelerometer can be disposed in the electro-hydraulic system 138 of the transmission 118 in FIG. 1. Alternatively, the accelerometer may be internally disposed within the TCC 142. In other embodiments, the accelerometer may be coupled to the transmission 118, drive unit 102, or another location on the vehicular system 100. In any event, the accelerometer can continuously measure road grade (RG) and communicate the measurement to the TCC.

In block 404, the TCC can detect service brake status. Here, the service brake status can be one of a plurality of conditions. For instance, the service brake may be unapplied. Alternatively, the service brake may be tapped (i.e., held for a short amount of time). The service brake may be held by the operator. By obtaining the current road grade in block 402 and service brake status in block 404, the TCC can infer the operator's intention based on said measurement, engine brake switch status, and the amount of time the operator is applying the service brake. In one example, the TCC may infer an operator desires an increase in negative input torque (i.e., an increase in vehicle deceleration) if the engine brake is active and the measured road grade is fairly flat (i.e., little to no grade). In another example, the TCC may infer an operator desires to hold vehicle speed nearly constant if the engine brake is active and the vehicle is descending a hill (i.e., there is a measurable downhill grade). In a different example, the TCC may infer that an operator desires a slight decrease in vehicle acceleration if the service brake is tapped for a short amount of time and the measured road grade suggests the vehicle is traveling downhill. In a further example, the TCC may infer that the operator wants to rapidly decrease vehicle speed if the service brake is held for a longer period of time and the measured road grade suggests the vehicle is traveling downhill. Moreover, the TCC may infer that the operator wants to stop the vehicle if the service brake is held and the measured road grade suggests either a level grade or uphill grade. In any of these examples, the measured road grade is used to determine the desired maximum vehicle acceleration limit in block 204. The result of block 204 can be set to either zero or some negative value.

Once the limit is determined in block 204, method 200 proceeds to block 206 for calculating a brake preselect range. If the transmission is an infinitely-variable transmission, for example, then method 200 can calculate a gear or speed ratio to which the transmission is shifted to satisfy the operator's intention. In any event, method 200 can select the preselect range or gear ratio (or speed ratio) that will produce an amount of negative input torque to limit the vehicle to the desired maximum acceleration rate determined in block 204. In the embodiment in which the transmission has a plurality of selectable ranges (i.e., each of which has a discrete gear ratio), an active engine brake may produce more negative torque at higher engine speeds. As a result, if the TCC preselects down too many ranges or gear ratios, the amount of negative torque produced may be too much leading to operator discomfort. Thus, method 200 may only command a low enough preselect range such that the overall negative tractive effort will be close to holding the vehicle at the desired maximum deceleration rate determined in block 204.

In block 406 of FIG. 4, the TCC can determine a predicted value for vehicle acceleration, PVA. This predicted value can be based off a model that accounts for estimated vehicle mass (VM), engine torque (ET), gear ratio (GR), and actual tractive braking effort (ATBE). In block 408, for example, the TCC can determine the estimated vehicle mass, EVM. In some embodiments, the estimated vehicle mass, EVM, can be pre-programmed in the memory 144 of the TCC 142. As such, the estimated vehicle mass, EVM, can be retrieved from the memory 144 in order to determine the predicted value for vehicle acceleration, PVA. In other embodiments, the estimated vehicle mass, EVM, can be programmed into the memory 144, or alternatively the TCC 142 can run a set of instructions stored in the memory for determining a value of estimated vehicle mass, EVM.

In block 410, the engine torque 410 can be determined. In one embodiment, engine torque, ET, can be communicated over the data link 164 between the drive unit control circuit 160 and the TCC 142. In another embodiment, a sensor or other measuring device can measure engine torque, ET, and communicate said measurement to the TCC 142. Other known methods for determining engine torque, ET, can be used as well.

In block 412, the gear ratio, GR, of the current selected range can be determined. In an infinitely-variable transmission, the gear or speed ratio may not be specifically associated with a certain selectable range. Nonetheless, the TCC 142 can determine gear ratio, GR, based on speed measurements by the speed sensors 146, 148, 150 as described above. Other known methods can be used for determining the current gear or speed ratio.

The actual tractive braking effort (ATBE) can be determined by the TCC 142 in block 414. The actual tractive braking effort is a function of engine torque (ET), gear ratio (GR), and driveshaft rotational speed (DRS). In one embodiment, the driveshaft speed, DRS, may correspond to a speed measurement made by speed sensor 150. Other methods for measuring driveshaft speed, DRS, can be used in block 414 as well. The actual tractive braking effort, ATBE, can therefore be calculated as follows:

$$ATBE = (ET) \times (GR) \times (DRS)$$

Once ATBE is determined in block 414, the current vehicle acceleration, CVA, can be measured. Vehicle acceleration is a function of vehicle speed, and actual or current vehicle speed can be determined as a function of engine or input speed (as measured by speed sensor 146), torque ratio (a function of torque converter model), gear ratio (GR), and rear axle ratio (RAR). The rear axle ratio is a ratio of the number of revolutions of the propeller or drive shaft 128 required to turn the axle 132 one complete revolution. The torque ratio and rear axle ratio can be pre-programmed in the memory 144 of the TCC 142. With vehicle speed measured as a function of input speed, the actual vehicle acceleration can be calculated accordingly. Alternatively, a sensing device or accelerometer can measure vehicle acceleration and communicate the measurement to the TCC 142.

Once the current vehicle acceleration, CVA, is measured in block 416, the predicted vehicle acceleration, PVA, can be compared to the current vehicle acceleration, CVA, in block 418. In doing so, the TCC can determine PVA for any given condition and compare it to the CVA to calculate an acceleration deviation value, ADV. The acceleration deviation value, ADV, can be computed as follows:

$$ADV = PVA - CVA$$

In the calculation above, a gain or constant value can also be included in the calculation. The acceleration deviation value, ADV, can be used for adjusting the preselect to a range or ratio that accounts for error in the calculation of PVA. Moreover, the above calculation for ADV can be based on the status of the service brake. In one example, if the service brake is inactive, then the above calculation is used by the TCC 142 to compute ADV. Otherwise, a different value or means is used to determine ADV. As previously described, the service brake status can be communicated to the TCC 142 as a proportional signal indicating either an active or inactive state.

Figure 5:
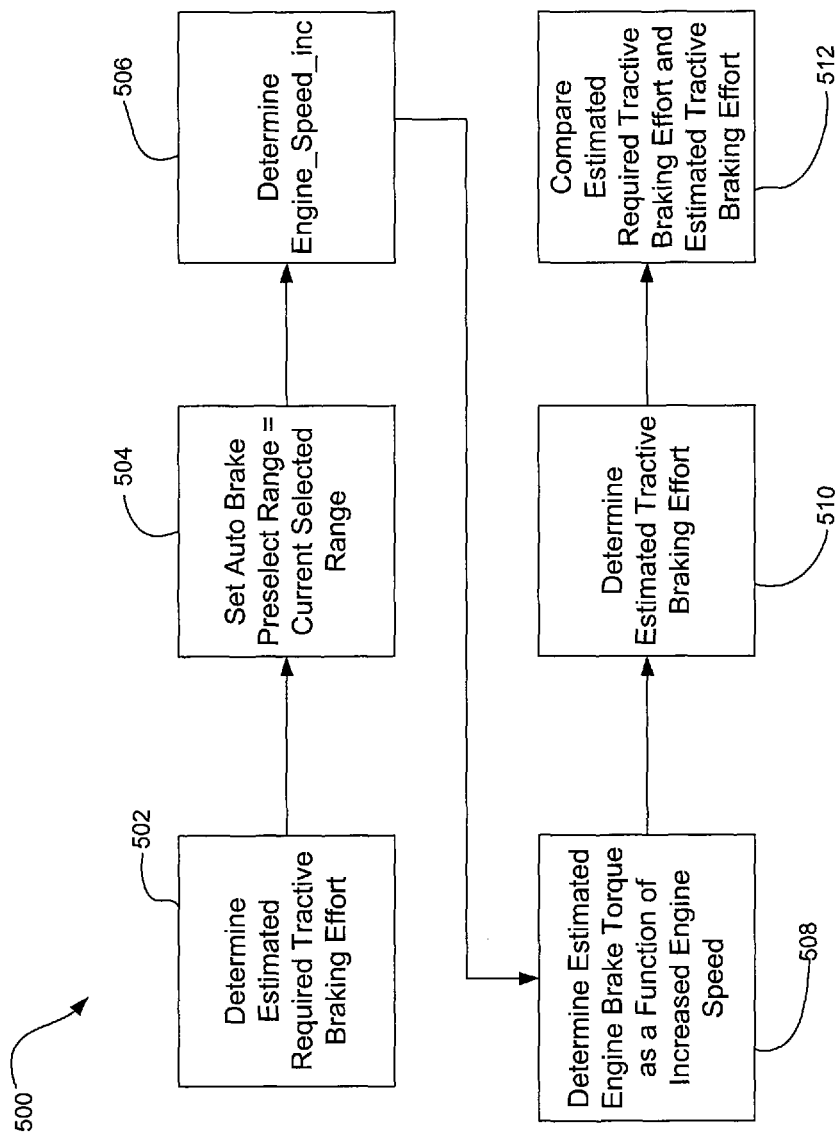
FIG. 5 is a flow diagram of a system and process for calculating one or more preselect ranges.

Once the acceleration deviation value, ADV, is determined in block 418, the process 500 specified in FIG. 5 can provide additional logic by which the TCC 142 follows for preselecting a certain range or ratio of the transmission. In FIG. 5, the process 500 can include block 502 where the TCC 142 determines an estimated required tractive braking effort, ERTBE. The estimated required tractive braking effort, ERTBE, can be determined as follows:

$$ERTBE = (EVM) \times (DMVAL + ADV + 9.8067 \times RG) + F_{drag}$$

DMVAL refers to the desired maximum vehicle acceleration limit as determined in block 204. As previously described, EVM refers to estimated vehicle mass and RG refers to measured road grade. $F_{drag}$ refers to an aerodynamic load or force function that defines an aerodynamic drag force that the vehicle carrying the engine or drive unit 102 and transmission 118 experiences during operation. $F_{drag}$ can be a function of vehicle speed and on the configuration of the vehicle carrying the engine or drive unit 102 and transmission 118. In one embodiment, the aerodynamic load, $F_{drag}$, can be selectable from a number of such functions stored in the memory 144, a memory of the drive unit control circuit 160, or a conventional service tool. In other embodiments, the aerodynamic load can be programmed in the memory 144.

In block 504, the TCC 142 can set an autobrake preselect range to the current selected range or gear ratio. In a transmission 118 having N selectable forward ranges, where N is a positive integer, $N_{Max}$ corresponds to the maximum range having the lowest discrete gear ratio ($R_{min}$), $N_{Min}$ corresponds to the minimum range having the highest discrete gear ratio ($R_{max}$), and range C corresponds to the current selected range that has a gear ratio (R) equal to either the lowest discrete gear ratio ($R_{min}$), the highest discrete ratio ($R_{max}$) or some gear ratio therebetween. In one example, a transmission may have ten (10) selectable forward ranges, i.e., N=10, where $N_{Max}$ corresponds to 10 and $N_{Min}$ corresponds to 1. In the event method 200 is enabled and the transmission is operating in current range C=6, the TCC 142 can determine which of the downshift ranges (e.g., ranges 1-5) to shift the transmission to satisfy operator's intent of desired vehicle deceleration. In this example, the downshift ranges can be referred to as C-1 to $N_{Min}$.

In block 510, the TCC 142 can determine estimated tractive braking effort, ETBE. In order to determine ETBE, the TCC 142 first determines an incremental Engine Speed value, $ES_{inc}$, for a range corresponding to C-1 in block 506. In the example above, this would correspond with $5^{th}$ range, i.e., C-1=5. In this instance, in block 506 the TCC 142 computes the engine speed value, $ES_{inc}$, based on Range 5. This calculation in block 506 is a comparison of the gear ratios of C and C-1. Based on the results of blocks 508, 510, and 512, the TCC 142 can determine engine speed values, $ES_{inc}$, for each downshift range between C-1 and $N_{Min}$. In another embodiment, the TCC 142 may determine the incremental engine speed values for all ranges between C and $N_{Min}$. Alternatively, the TCC 142 can be programmed to determine all incremental engine speed values between $N_{Max}$ and $N_{Min}$.

Turning to block 508, the TCC 142 can determine an estimated engine brake torque (EEBT) as a function of increased engine speed. The estimated engine brake torque, EEBT, can be computed as follows:

$$EEBT = (EBTGain) \times CET$$

In the calculation above, EBTGain can be defined as a value structured in a five (5) point table defined as an x-ratio of gear ratio and a y-axis of gear ratio. This value can be stored in and retrieved by the TCC 142 from its memory 144. CET can refer to current engine torque which can be determined by the TCC 142 according to any known method or as described in block 410.

In block 510, the TCC 142 can determine estimated tractive braking effort, ETBE. The value of estimated tractive braking effort, ETBE, can be calculated as follows:

$$ETBE = (EEBT) \times (GR_{-1}) \times (DRS)$$

In the calculation above, the value of $GR_{-1}$ refers to the gear ratio of the range R-1. Thus, in the example above, if the current range R is 6, then $GR_{-1}$ refers to the gear ratio of Range 5. Once the estimated tractive braking effort, ETBE, is determined in block 510, this value of ETBE can be compared to the estimated required tractive braking effort, ERTBE, as determined in block 502. As part of block 512, the TCC 142 can further detect if the value of ETBE is approximately the same as or within a threshold (K) of ERTBE for a given range. If so, then the TCC 142 can adjust the preselect range from the current selected range in block 504 to whatever downshift range corresponds to ERTBE+K>ETBE(C-j), where "C-j" is a range defined between C-1 and $N_{Min}$. As such, the TCC 142 can preselect range C-j in block 208 to further meet the operator's intent for desired vehicle deceleration.

In the above-described calculations and determinations, method 200 can determine the best range to shift into to meet operator's intent based on road grade and vehicle mass. Thus, in determining the desired preselect and deceleration based on operator's intent, method 200 can base this determination on measured deceleration and a predicted or model-based deceleration. While road grade and vehicle mass can be good estimates or values for predicting desired deceleration, the predicted deceleration can include various errors when compared to the actual or measured deceleration. Thus, in block 418, the acceleration deviation value (ADV) can be useful to offset or correct for errors in the predicted vehicle acceleration, PVA. Once a correction factor or error is accounted for in the model-based acceleration value, the TCC 142 can more accurately determine which preselect range to shift the transmission to in block 208. In this manner, method 200 can form a feedback-like model used to modify the predicted vehicle acceleration (PVA) based on the calculated ADV.

To further illustrate this in an example, the operator's intended deceleration may be −1 mile/hr/sec. The predicted vehicle acceleration, PVA, may compute vehicle deceleration under current conditions at 0 mile/hr/sec. Thus, to meet operator's intended deceleration rate, the TCC 142 can preselect to a downshift range to increase vehicle deceleration from 0 mile/hr/sec to −1 mile/hr/sec. However, in performing method 200, the TCC 142 may determine that the ADV in block 418 is −0.5 mile/hr/sec. Based on the ADV computation, the TCC 142 determines that a correction factor or error of 0.5 mile/hr/sec exists in the PVA, and therefore the TCC 142 may only preselect to a downshift range based on −0.5 mile/hr/sec deceleration rather than −1 mile/hr/sec.

In the event the transmission is an infinitely-variable or continuously-variable transmission, the TCC 142 can perform method 200 to determine the desired preselect range to meet operator's intent. To do so, however, the TCC 142 can determine a desired gear or speed ratio to satisfy such intent and control the transmission to that desired ratio.

In one aspect of this disclosure, the TCC 142 can monitor for a condition referred to as "shift-in-process". Here, some of the calculations referred to in FIG. 5 may be skipped or delayed for a period of time when the TCC 142 determines that "shift-in-process" is occurring. During a "shift-in-process", the TCC 142 may be commanding the transmission to function in a certain manner. For instance, the TCC 142 may command the transmission to shift to a different range or gear ratio. In the logic stored in the memory 144, a delay may be triggered before method 200 can be enabled or performed. This can allow the system to stabilize during and after a shift before the TCC 142 makes another preselect determination as a result of method 200.

In another aspect, the determination of block 210 can affect the final preselect range made in block 208. For example, if one of the modes in blocks 302, 308 and 314 is active, the final preselect range can be set to the maximum of the calculated preselect range in block 206 and the VEPS parameter engine brake preselect range. For instance, the TCC 142 can be programmed to limit the preselect range to the current selected range when in block 322 the autobrake preselect state is active, cruise control is inactive in block 304 and engine brake is active in blocks 308 and 310. However, when the autobrake preselect state is active and either cruise control is active in block 304 or the grade braking status is active in block 314, the preselect range limit can be set to a function of the VEPS grade brake-service brake interaction level of block 316.

If the TCC 142 determines or calculates an increase in preselect range during either grade braking or cruise braking (including a transition from engine braking to one of these other active states), the rate of increase can be limited to one range over a defined period of time. The TCC 142 can include an internal clock or timing mechanism to limit the rate of increase. This rate of increase can be adjusted if the derived throttle position (accelerator pedal or percent load while in cruise) is above a threshold.

In another aspect, if the operator reselects drive while autobrake preselect state is active, the TCC 142 can reset the preselect range to a maximum range for the transmission (i.e., $R_{Max}$). The TCC 142 can still re-calculate the preselect range lower if the logic calculates it to be lower in subsequent calculations. Related thereto, other system states (i.e., desired acceleration, integrator output of service brake) may not be reset by this input.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of selecting a gear ratio of a transmission in a motor vehicle to produce an increase in negative input torque, the transmission including a controller and N automatically selectable gear ratios, comprising:
   measuring a current road grade with a sensing device and communicating the current road grade measurement to the controller;
   receiving by the controller a signal corresponding to a service brake input from the vehicle;
   determining by the controller a desired maximum acceleration limit of the vehicle based on the current road grade and service brake input signal;

calculating by the controller a predicted vehicle acceleration based on the current road grade and an estimated vehicle mass;

determining by the controller a current vehicle acceleration, wherein the current vehicle acceleration is determined by calculating by the controller the current vehicle acceleration or by measuring by the controller a vehicle acceleration through a sensing device;

computing by the controller an estimated required tractive braking effort and estimated tractive braking effort for at least one of the N automatically selectable gear ratios of the transmission; and selecting by the controller one gear ratio of the N automatically selectable gear ratios for operation of the transmission based on a comparison of the estimated required tractive braking effort and estimated tractive braking effort.

2. The method of claim 1, further comprising:
detecting an enabled VEPS interaction level; and
determining the desired maximum acceleration limit based on the enabled VEPS interaction level.

3. The method of claim 2, further comprising:
receiving a first signal from a throttle position sensor corresponding to a position of an accelerator pedal, a second signal from an engine brake corresponding to an engine brake status, and a third signal corresponding to a cruise control status; and
determining by the controller a condition of an autobrake preselect state based on the detected VEPS interaction level, first signal, second signal, and third signal.

4. The method of claim 2, wherein the detecting step comprises determining by the controller if a first VEPS parameter, a second VEPS parameter, or a third VEPS parameter is enabled;
where, the first VEPS parameter is related to an interaction between a service brake and engine brake, the second VEPS parameter is related to an interaction between a grade brake and the service brake, and the third VEPS parameter is related to an interaction between an engine brake and the cruise control setting.

5. The method of claim 1, further comprising passing the signal corresponding to the service brake input through an integrator by the controller to infer a desired deceleration rate.

6. The method of claim 1, further comprising:
receiving by the controller a signal corresponding to input torque to the transmission;
measuring a driveshaft speed with a speed sensor; and
calculating by the controller actual tractive braking effort as a function of input torque, current gear ratio, and measured driveshaft speed.

7. The method of claim 6, wherein the calculating the predicted vehicle acceleration comprises calculating predicted vehicle acceleration as a function of actual tractive braking effort and an aerodynamic load.

8. The method of claim 1, further comprising controlling shifting by the controller to the selected one gear ratio for the operation of the transmission such that vehicle acceleration after the selecting step is equal to or less than the desired maximum acceleration limit.

9. The method of claim 1, further comprising:
determining by the controller a current gear ratio, C, from the N automatically selectable gear ratios of the transmission;
calculating by the controller an estimated tractive braking effort for one or more of the N automatically selectable gear ratios from C to $R_{Max}$ until the estimated required tractive braking effort is approximately equal to or greater than the calculated estimated tractive braking effort, where $R_{Max}$ corresponds to the maximum gear ratio of the N automatically selectable gear ratios;

selecting by the controller the gear ratio between C and $R_{Max}$ that corresponds to the estimated required tractive braking effort being equal to or greater than the calculated estimated tractive braking effort; and controlling shifting by the controller from C to the selected gear ratio for the operation of the transmission if the selected gear ratio is different from C.

10. A system for selecting a gear ratio for operably decelerating a motor vehicle, comprising:
a transmission having a plurality of automatically selectable gear ratios;
a transmission control circuit configured to control operation of the transmission;
a sensing device electrically coupled to the transmission control circuit, the sensing device configured to measure road grade;
an engine control circuit configured to control operation of an internal combustion engine operatively coupled to the transmission; and
a data link established between the transmission control circuit and engine control circuit;
wherein the transmission control circuit includes a memory having instructions stored therein that are executable by the transmission control circuit to enable an autobrake preselect logic, determine a desired maximum acceleration limit of the vehicle as a function of road grade, calculate a predicted vehicle acceleration as a function of road grade and an estimated vehicle mass, calculate a difference between the predicted vehicle acceleration and actual vehicle acceleration, compute an estimated required tractive braking effort and estimated tractive braking effort for at least one of the plurality of automatically selectable gear ratios and select a gear ratio from the plurality of gear ratios for operation of the transmission based on a comparison of the estimated required tractive braking effort and estimated tractive braking effort.

11. The system of claim 10, further comprising:
a throttle control sensor electrically coupled to the datalink for communicating a signal to the transmission control circuit corresponding to accelerator pedal position;
a service brake sensor electrically coupled to the datalink for communicating a signal to the transmission control circuit corresponding to a service brake input;
wherein, the instructions stored in the memory of the transmission control circuit include instructions that are executable by the transmission control circuit to compare the signal from the throttle control sensor to a threshold, determine a status of the service brake input, and based on said comparison and status, determine whether to enable the autobrake preselect logic.

12. The system of claim 10, wherein the instructions stored in the memory of the transmission control circuit include instructions that are executable by the transmission control circuit to detect an enabled VEPS interaction level and determine the desired maximum acceleration limit based on the enabled VEPS interaction level.

13. The system of claim 10, wherein the instructions stored in the memory of the transmission control circuit include instructions that are executable by the transmission control circuit to determine a current gear ratio of the transmission, calculate the estimated tractive braking effort for one or more of the plurality of automatically selectable gear ratios from between the current gear ratio and a maximum gear ratio until the estimated required tractive braking effort is approximately equal to or greater than the calculated estimated tractive braking effort, and select the gear ratio between the current gear ratio and the maximum gear ratio that corresponds to the estimated required tractive braking effort being equal to or greater than the calculated estimated tractive braking effort.

14. A method of controlling a transmission in a motor vehicle, comprising:

provides N automatically selectable gear ratios of the transmission, the N automatically selectable gear ratios including a minimum gear ratio $R_{Min}$ and a maximum gear ratio $R_{Max}$, a transmission control circuit for operably controlling the transmission, an internal combustion engine operably producing input torque to the transmission, an engine control circuit for operably controlling the engine, a data link establishing electrical communication between the engine control circuit and the transmission control circuit, and an engine brake operably coupled to the engine;

receiving by the transmission controller circuit a first signal from a throttle position sensor corresponding to a position of an accelerator pedal, a second signal from the engine brake corresponding to an engine brake status, and a third signal corresponding to a cruise control status;

determining by the transmission controller circuit an autobrake preselect state as a function of a comparison of the first signal to a first threshold, the second signal to a second threshold, and the third signal to a third threshold;

measuring grade with a sensing device and communicating the grade measurement to the transmission control circuit;

receiving by the transmission controller circuit a fourth signal corresponding to a service brake input from the vehicle;

determining by the transmission controller circuit a desired maximum acceleration limit of the vehicle based on the measured grade and fourth signal;

calculating by the transmission controller circuit a predicted vehicle acceleration based on the grade and an estimated vehicle mass;

measuring a current vehicle acceleration;

calculating by the transmission controller circuit an acceleration difference between the predicted vehicle acceleration and the current vehicle acceleration;

computing by the transmission controller circuit an estimated required tractive braking effort based on the estimated vehicle mass, the desired maximum acceleration limit, the grade measurement, and the acceleration difference;

determining by the transmission controller circuit a current gear ratio, C, from the N automatically selectable gear ratios of the transmission;

calculating by the transmission controller circuit an estimated tractive braking effort for each automatically selectable gear ratio from C to $R_{Max}$ until the estimated required tractive braking effort is approximately equal to or greater than the calculated estimated tractive braking effort;

selecting by the transmission controller circuit a desired gear ratio between C and $R_{Max}$ that corresponds to the estimated required tractive braking effort being equal to or greater than the calculated estimated tractive braking effort; and controlling by the transmission controller circuit shifting from C to the desired gear ratio for the operation of the transmission if the desired gear ratio is different from C.

15. The method of claim 14, further comprising:

detecting by the transmission control circuit an enabled VEPS interaction level; and determining by the transmission control circuit the desired maximum acceleration limit based on the enabled VEPS interaction level.

16. The method of claim 14, further comprising determining by the transmission control circuit the autobrake preselect state based on the detected VEPS interaction level, first signal, second signal, and third signal.

17. The method of claim 16, wherein the detecting step comprises determining if a first VEPS parameter, a second VEPS parameter, or a third VEPS parameter is enabled;

where, the first VEPS parameter is related to an interaction between a service brake and engine brake, the second VEPS parameter is related to an interaction between a grade brake and the service brake, and the third VEPS parameter is related to an interaction between the engine brake and cruise control setting.

18. The method of claim 14, further comprising passing the fourth signal through an integrator by the transmission control circuit to infer a desired deceleration rate.

19. The method of claim 14, further comprising:

receiving by the transmission control circuit a fifth signal corresponding to input torque to the transmission;

measuring a driveshaft speed with a speed sensor; and calculating by the transmission control circuit actual tractive braking effort as a function of the input torque, current gear ratio, and measured driveshaft speed.

20. The method of claim 19, wherein the calculating the predicted vehicle acceleration step comprises calculating predicted vehicle acceleration as a function of the actual tractive braking effort and an aerodynamic load.

* * * * *